United States Patent
Alban et al.

(10) Patent No.: US 9,067,173 B2
(45) Date of Patent: Jun. 30, 2015

(54) METHOD AND EQUIPMENT FOR TREATING $CO_2$-RICH SMOKE

(75) Inventors: Bruno Alban, Houston, TX (US);
Philippe Arpentinier, Houston, TX (US); Alain Briglia, Houston, TX (US);
Serge Moreau, Houston, TX (US);
Fabrice Del Corso, Houston, TX (US);
Benoit Davidian, Houston, TX (US)

(73) Assignee: L'Air Liquide SociétéAnonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 339 days.

(21) Appl. No.: 13/634,276

(22) PCT Filed: Feb. 25, 2011

(86) PCT No.: PCT/FR2011/050393
§ 371 (c)(1),
(2), (4) Date: Nov. 19, 2012

(87) PCT Pub. No.: WO2011/114035
PCT Pub. Date: Sep. 22, 2011

(65) Prior Publication Data
US 2013/0055891 A1    Mar. 7, 2013

(30) Foreign Application Priority Data
Mar. 15, 2010    (FR) ..................... 10 51820

(51) Int. Cl.
B01D 47/00    (2006.01)
C01B 31/20    (2006.01)
(Continued)

(52) U.S. Cl.
CPC .............. B01D 53/263 (2013.01); B01D 47/00 (2013.01); C01B 31/20 (2013.01); B01D 53/002 (2013.01);
(Continued)

(58) Field of Classification Search
CPC ...................................................... C01B 31/20
USPC ........... 95/149, 187, 188, 191, 206, 228, 230
See application file for complete search history.

(56) References Cited

U.S. PATENT DOCUMENTS 7,416,716 B2 *    8/2008    Allam et al. ............... 423/437.1
2004/0055309 A1    3/2004    Bellows et al.

FOREIGN PATENT DOCUMENTS

EP    0503910    9/1992
EP    1790614    5/2007
(Continued)

OTHER PUBLICATIONS

PCT/FR2011/050393, International Search Report, Jun. 9, 2011 (5 pp).
(Continued)

Primary Examiner — Robert A Hopkins
(74) Attorney, Agent, or Firm — Justin K. Murray

(57) ABSTRACT

The invention relates to a method for treating a gas stream comprising combustion fumes containing CO2 in an initial proportion, water vapor, one or more volatile acid compounds, and one or more additional impurities selected from among oxygen, nitrogen and argon, comprising the steps of: i) compressing the gas stream to a final pressure of 1 bar to 74 bar absolute; ii) cooling the gas stream to a temperature of around −10° C. to around −130° C. and eliminating at least one additional impurity; and iii) recovering a CO2-enriched gas stream containing a final proportion of CO2 greater than the initial proportion of CO2 in the stream to be treated. In addition, the method comprises, prior to step i), a step of pre-drying the stream for removing therefrom at least a portion of the water vapor which it contains.

9 Claims, 1 Drawing Sheet

(51) Int. Cl.
- B01D 53/26 (2006.01)
- B01D 53/00 (2006.01)
- B01D 53/62 (2006.01)
- B01D 53/64 (2006.01)
- B01D 53/75 (2006.01)
- F23J 15/02 (2006.01)
- F25J 3/02 (2006.01)
- F25J 3/04 (2006.01)
- F25J 3/06 (2006.01)

(52) U.S. Cl.
CPC ............... B01D 53/62 (2013.01); B01D 53/64 (2013.01); B01D 53/75 (2013.01); B01D 2251/302 (2013.01); B01D 2251/404 (2013.01); B01D 2256/22 (2013.01); B01D 2257/102 (2013.01); B01D 2257/104 (2013.01); B01D 2257/11 (2013.01); B01D 2257/302 (2013.01); B01D 2257/404 (2013.01); B01D 2257/602 (2013.01); B01D 2258/00 (2013.01); F23J 15/02 (2013.01); F23J 2215/50 (2013.01); F23J 2215/60 (2013.01); F23J 2219/40 (2013.01); F23J 2219/70 (2013.01); F25J 3/0266 (2013.01); F25J 3/04533 (2013.01); F25J 3/04563 (2013.01); F25J 3/067 (2013.01); F25J 2205/32 (2013.01); F25J 2205/34 (2013.01); F25J 2210/70 (2013.01); F25J 2220/80 (2013.01); F25J 2230/08 (2013.01); F25J 2230/30 (2013.01); F25J 2260/44 (2013.01); F25J 2270/90 (2013.01); Y02C 10/12 (2013.01); Y02C 10/04 (2013.01)

(56) References Cited

FOREIGN PATENT DOCUMENTS

| | | |
|---|---|---|
| EP | 1952874 | 8/2008 |
| WO | WO2010014520 | 2/2010 |

OTHER PUBLICATIONS

Wilkinson et al., Oxyfuel Conversion of Heaters and Boilers for CO2 Capture, Second National Conference on Carbon Sequestration, May 5-8, 2003, Washington, DC (17 pp).

* cited by examiner

METHOD AND EQUIPMENT FOR TREATING $CO_2$-RICH SMOKE

CROSS-REFERENCE TO RELATED APPLICATIONS

This application is a §371 of International PCT Application PCT/FR2011/050393, filed Feb. 25, 2011, which claims §119 (a) foreign priority to French patent application 1051820, filed Mar. 15, 2010.

FIELD OF THE INVENTION

The invention relates to a CPU process for capturing and purifying the $CO_2$ present in combustion flue gases, in particular oxy-combustion flue gases, or flue gases from cement works, with a predrying stage carried out before compression, so as to remove, upstream of the process, at least a portion of the water and optionally of the mercury which may be present in said flue gases.

SUMMARY OF THE INVENTION

The flue gases resulting from the combustion of carbon-based materials, for example to produce energy, comprise numerous volatile compounds having different natures.

This is all the more significant with fossil fuels, such as "low-value" hydrocarbons, in particular coal, or liquid hydrocarbons, such as oil, than with those of "higher value", such as natural gas, for example.

These flue gases include mainly $CO_2$, water (vapor), atmospheric gases (often referred to as "noncondensable products") carried by the oxidant, for example mainly residual oxygen, nitrogen and argon when air is used as oxidant, but also acid gases, such as $SO_x$ and $NO_x$; solid particles and many other minor compounds often originating from the carbon-based material used, in particular metals, such as mercury, arsenic, and the like.

The nature of the compounds and their amounts depend in addition on the combustion process employed.

Thus, combustion with "pure" oxygen instead of air, also known as "oxy-combustion", makes it possible in particular to concentrate the flue gases in $CO_2$. This then facilitates the use of subsequent processes which are targeted at moving a significant share of the $CO_2$ in the flue gases before they are discharged to the environment. These purification processes, which use units for capturing and purifying $CO_2$, are commonly referred to as "$CO_2$ CPU processes" (CPU means Compression and Purification Unit) or more simply "CPU processes".

Generally, such a CPU process is targeted at producing virtually pure $CO_2$, which requires the removal of all the other compounds included in the flue gas to be treated.

To do this, use is usually made of a sequence of successive unit operations which make possible the sequential removal of the impurities.

In point of fact, one of the major problems consists in managing to condense a portion of the flue gas, namely the water vapor which forms a major portion of the flue gas, in order to avoid entraining a portion of the acid gases with the water. This is because producing acid water may prove to be harmful to the equipment used during the subsequent phases of the process, in particular the compressor and its cooling systems.

It is therefore essential to be able to remove the water and the acid gases in separate stages of the CPU process.

In general, in CPU processes, the acid gases are removed, for example by washing with alkaline absorbants, such as calcium carbonate, before compressing the flue gas, which then brings about liquefaction of a portion of the water vapor, and then drying the gas, by adsorption, for example, in order to remove the residual water. This is because the final part of the CPU process, which is targeted at producing the purified $CO_2$, often employs a (or several) cryogenic stage which does not accept water in the incoming gas to be treated.

More specifically, a CPU process used to treat flue gases originating from an oxy-combustion usually comprises the following successive stages:

a) if necessary, a cooling targeted at lowering the temperature of the flue gas to a value compatible with the process, namely, in general, to a temperature of less than 100° C., typically between 50 and 70° C., generally in the vicinity of 60° C. This stage is concomitant with the condensation of a good portion of the water and impurities present in the flue gas. In this stage, the gas is at low pressure, that is to say at less than 1.2 bar absolute and more generally at a pressure of less than atmospheric pressure, that is to say under vacuum.

b) a removal of a portion of the acid gases, in particular the $SO_x$ and the $NO_x$, via one or more washing operations with sodium hydroxide or calcium carbonate, for example. Thus, during the following stages of the process, all or part of the appearance, by condensation, of an acidic liquid phase harmful to the equipment used, namely the compressor and the cooling systems which are associated with it, employing the CPU process is avoided.

c) a compression of the gas resulting from b) in order to achieve the final pressure desired, for example a high pressure between 1 and 74 bar absolute, typically between 2 and 30 bar abs.

d) optionally, a washing operation on the high-pressure gas in order to remove certain residual impurities.

e) a drying operation on the gas as the following stage f) of the process is a cryogenic stage (temperature in the vicinity of the triple point of $CO_2$, namely in the vicinity of −56° C.) and the gas cannot comprise water, which would solidify to give ice and would risk blocking certain items of cryogenic equipment. The drying can be carried out in different ways, for example by means of an adsorbant capable of trapping the water present in a gas stream charged with $CO_2$, for example with a (or more) bed of adsorbant of alumina, silica gel or zeolite type; or by cryogenic trapping.

f) a decrease in the temperature of the gas to approximately the triple point of $CO_2$, that is to say to approximately −56° C., and removal by distillation of the noncondensable gases present, that is to say, inter alia, of the atmospheric gases, that is to say mainly $O_2$, $N_2$ and/or Ar. In this stage, use is made of conventional devices of cryogenics, such as a cold box and one or more cryogenic distillation columns.

Although this CPU process is commonly employed in the industry, it has been observed in practice that it is not effective enough under certain operating conditions.

Thus, when the incoming flue gases are rich in certain volatile compounds originating from the combustion of "low-value" hydrocarbons, in particular mercury, indeed even arsenic and/or selenium, it has been found that the removal of these specific compounds is often difficult and results in an expensive investment in equipment as it requires the addition of specific stages and/or units. This is harmful to the profitability and/or to the overall productivity of the process.

Furthermore, there exists a problem of water in the "ambient" part of the process, that is to say during the compression and the cooling in the coolers of the compressor.

In point of fact, this water can cause damage to the compressor and cooling systems which are associated with it. This is because, during the cooling, strong acids in a liquid form are formed in the presence of water and acid gases.

The condensate which results therefrom is then a strong acid, in particular nitric acid and/or sulfuric acid mainly, the pH of which can easily be less than 1, which will bring about accelerated corrosion of the equipment if use is not made of noncorrosive or less easily corrosive noble materials were not used for manufacturing it.

In point of fact, to use noble materials is not always possible and, furthermore, results in high cost, which is not desirable.

The problem is consequently to improve the CPU processes and plants currently used to purify combustion flue gases comprising $CO_2$ and other compounds and to produce $CO_2$-rich gases, this being achieved without necessarily having to resort to noble materials to manufacture all or part of the items of equipment and to thus avoid or slow down the corrosion thereof.

In particular, the problem is to be able to more efficiently remove not only the water vapor present in combustion flue gases additionally comprising $CO_2$ to be recovered by the CPU process, in order to prevent the water from damaging the items of equipment employed, in particular the compressor and the cooling systems which are associated with it, but also one or more other harmful compounds, in particular mercury, which are liable to be found therein; in particular, it is desirable to be able to simply and simultaneously remove the water and the mercury when it is present.

The solution is a process, in particular a process of CPU type, for the treatment of a gas stream comprising a combustion flue gas comprising $CO_2$ in an initial proportion, water vapor, one or more volatile acidic compounds and one or more additional impurities chosen from oxygen, nitrogen and argon, comprising:

i) a compression of the gas stream down to a final pressure of between 1 bar and 74 bar absolute, ii) a cooling of the gas stream down to a temperature of between approximately −10° C. and approximately −130° C. and a removal of at least one additional impurity, iii) recovery of a gas stream enriched in $CO_2$ comprising a final proportion of $CO_2$ greater than the initial proportion of $CO_2$ in the stream to be treated, characterized in that it comprises, prior to stage i), a stage of predrying the stream in order to remove therefrom at least a portion of the water vapor which is present therein.

As the case may be, the process of the invention can comprise one or more of the following characteristics:

prior to stage i), a removal of at least a portion of the volatile acidic compound or compounds present in the gas stream.

between stages i) and ii), a drying operation on the gas stream compressed in stage i).

in stage ii), the cooling of the gas stream down to a temperature of between approximately −10° C. and approximately −100° C., preferably to a temperature of less than or equal to −80° C., more preferably to a temperature of less than or equal to −60° C. and more preferably to a temperature of less than or equal to approximately −56° C.

the predrying of the stream is carried out by adsorption, by absorption/condensation or by permeation.

the volatile acidic compound or compounds are chosen in particular from $NO_x$ and $SO_x$. The gas stream to be treated can comprise other volatile compounds, in addition to the $NO_x$ and the $SO_x$, for example volatile organic compounds (VOCs).

the predrying of the stream is carried out by absorption/condensation.

the predrying of the stream is carried out by bringing the gas stream into direct contact with a cooling liquid at a temperature of less than −20° C., preferably at a temperature of less than −30° C., and absorption/condensation within said cooling liquid of at least a portion of the water present in the stream.

the cooling liquid comprises an aqueous salt or a mixture of aqueous salts; in particular, the cooling liquid is a calcium chloride or lithium chloride solution.

the combustion flue gas additionally comprises mercury, at least a portion of the mercury being removed, during the predrying stage, by the cooling liquid.

an adjusting of the temperature of the gas stream to be treated down to a temperature of between 0° C. and 100° C., preferably between 5° C. and 45° C., is carried out between the predrying stage and the compression stage i). The adjusting in temperature is a cooling or a warming;

prior to the predrying stage, the stream comprises an initial proportion of water between 1000 ppm by volume and 30% by volume;

in stage i), the compression is carried out at an optimum pressure resulting in general from an overall optimum of the process for the purification of the $CO_2$ and depending in particular on the temperatures and pressures in the cryogenic part for separating as best as possible the $NO_x$ and the noncondensable products, that is to say the residual atmospheric gases;

after the predrying, the stream comprises an intermediate proportion of water of less than or equal to 1000 ppm by volume, preferably between 1 and 1000 ppm by volume;

the stream comprises a final proportion of water, that is to say at the cool box inlet, of less than or equal to 50 ppm vol;

the gas stream comprises an initial proportion of $CO_2$ of between 50% and 95% by volume, on a dry basis, and a final proportion of $CO_2$ of between 80 and 100% by volume, on a dry basis, in stage ii), the stream is cooled down to approximately −56° C. (triple point of $CO_2$);

in stage ii), at least one additional impurity chosen from oxygen, nitrogen and argon is removed;

after the predrying, the stream comprises a proportion of mercury of less than or equal to 0.1 μg/Nm$^3$;

the combustion flue gas additionally comprises arsenic and/or selenium; at least a portion of the arsenic and/or selenium present is removed, during the predrying stage, by the cooling liquid;

the adjusting of the concentration of said cooling liquid recovered after it has been brought into contact with the stream is carried out by drying said cooling liquid by bringing into contact with a dry gas and discharging a bleed stream comprising said dry gas and water vapor; preferably, the dry gas is nitrogen resulting from a cryogenic distillation unit;

the flue gas to be treated results from an oxy-combustion process or plant or from a process or plant for the manufacture of cement.

Another subject matter of the invention is a plant for the treatment of gas streams comprising:

a source (8) of a gas stream comprising a combustion flue gas comprising $CO_2$ and water vapor, a unit 1 for predrying by absorption/condensation, comprising a cooling liquid capable of removing at least a portion of the water vapor from said stream, a unit 2 for providing cooling liquid capable of providing a cooling liquid, the predrying unit 1 being fed with a gas stream via the source 8 of a gas stream and with cooling liquid via the unit 2 for providing cooling liquid, so as to carry out gas stream/cooling liquid direct contact within said predrying unit 1 and to absorb/condense at least a portion of the water within said cooling liquid, recycling means capable of recovering and designed to recover at least a portion of said water-charged cooling liquid and capable of recycling it and designed to recycle it to the unit 2 for providing cooling liquid, and a source of dry gas 3 feeding the dry gas to the unit 2 for providing cooling liquid, so as to carry out dry gas/cooling liquid direct contact within said unit 2 for providing liquid and to remove a bleed gas 7 formed of a mixture of dry gas and water vapor.

As the case may be, the plant of the invention can provide one or more of the following characteristics:

the source 8 of a gas stream comprising a combustion flue gas is an oxy-combustion unit or a unit for the manufacture of cement, and the source 3 of dry gas is a cryogenic distillation unit;

at least one heat-exchanging device 5 is arranged on the route of the cooling fluid circulating from the unit 2 for providing cooling liquid to the predrying unit 1 and/or on the route of the gas stream resulting from the predrying unit 1;

at least a portion of the gas stream resulting from the predrying unit 1 is sent to at least one gas compression unit 4, a gas purification unit and a gas drying unit.

A better understanding of the invention will now be obtained by virtue of the following explanations made with reference to the appended figures.

In order to improve the treatment processes, in particular the CPU processes, used to purify oxy-combustion flue gases, indeed even flue gases discharged by cement manufacturing units, while avoiding damage to the equipment, in particular to the compressor and cooling systems which are associated with it, by water present in the flue gas, the proposal is made, according to the present invention, to carry out a predrying of the gas stream to be treated, that is to say of the oxy-combustion flue gas comprising $CO_2$ to be purified and recovered, before it is treated in the CPU process proper.

This is because carrying out a predrying of the combustion flue gases makes it possible to remove a large portion of the water vapor which is present in them and therefore to thus avoid the subsequent condensation thereof and therefore the appearance of a liquid phase harmful to the materials and equipment (compressor, cooling systems, and the like) employed to purify and recover the $CO_2$ present in the flue gases to be treated by the CPU process.

Furthermore, removing a portion of the water vapor upstream of the CPU process also makes it possible to exercise better management over the subsequent treatment of the gas stream, the composition of which is complex since it comprises numerous different entities, in particular metals, such as mercury, acidic compounds, such as $SO_x$ and $NO_R$, noncondensable products, such as $O_2$, $N_2$ or Ar, and the like, and also a high proportion of $CO_2$.

In order to do this, use may be made of any drying means suitable for the drying of a condensable flue gas, that is to say a flue gas comprising water above the dew point; in particular, the predrying can be carried out by adsorption, by membrane permeation or by absorption/condensation (washing).

However, in the context of the present invention, a predrying by absorption/condensation, that is to say a "washing", is preferred as it exhibits a number of advantages, in particular that it is already used in other industrial processes, and is thus well mastered, and is furthermore well suited to complex streams, for example to dust-comprising gas streams.

In the case of such a predrying by absorption/condensation (i.e. washing) of the water, it is appropriate to treat the gas stream by lowering its temperature sufficiently in order to efficiently remove the water therefrom.

In other words, the temperature of the gas stream, that is to say of the flue gas to be treated, must be lowered by direct contact with a cooling liquid until the dew point of the flue gas at which the water condenses is reached, so as to avoid any secondary or undesirable condensation in the "hot" part of the process (compressors, cooling systems, and the like), whatever the pressure and temperature conditions employed during each subsequent stage in the process when the flue gas remains humid.

According to a preferred embodiment, the predrying of the flue gases, that is to say the removal of a portion of the water which is found therein, can be carried out by washing (absorption/condensation) of the flue gases by flue gas/cooling liquid direct contact and condensation of the water which is found therein, as illustrated in the appendix, FIGS. 1 and 2.

In this case, the gas stream encounters a fluid which is sufficiently cold to allow it to reach the desired dew point. In order to do this, the following are chosen:

a liquid capable of remaining in the liquid state even at temperatures far below 0° C., preferably below −20° C., typically below −30° C. Thus, use may be made of aqueous salts or mixtures of aqueous salts which make it possible to operate in the vicinity of −50° C.; for example, use may be made of 30% by weight calcium chloride or 25% by weight lithium chloride.

a contactor of packed column type in order to produce contact between gas and liquid.

a source of cold in order to cool the liquid which will be reheated on contact with the hot flue gas, for example a conventional cold cycle with aqueous ammonia or the use of cold originating from the cryogenic stages of the CPU process.

a loop for recycling the liquid and for adjusting its concentration in order to maintain an unchanging content of liquid, given that the latter tends to become charged with impurities and/or to decompose on contact with the flue gases. In general, in order to do this, provision is made for an injection of virgin solution at the liquid inlet of the contactor and a bleed at the outlet of the liquid from the contactor in order to retain an unchanging volume in the loop for recycling the liquid. In other words, means are provided which are capable of carrying out recycling of the washing solution (cooling liquid) which would otherwise end up by becoming saturated, namely becoming sufficiently charged with water to no longer halt anything. In order to do this, an additional washing solution is continually introduced into this recycling loop in order for the combined cooling liquid always to remain reactive, that is to say unsaturated with water. In point of fact, as a liquid (noncompressible) is concerned and as the volume of the recycling loop is fixed, it is necessary to bleed off the same flow rate (i.e., amount) of liquid that enters the loop in order to prevent the accumulation of the water and thus "clogging".

A significant advantage of removal of impurities by direct contact with a suitable fluid lies in the possibility of carrying out a simultaneous or concomitant removal of the water and the mercury strongly present in the flue gases originating from the combustion of certain solid fossil fuels, in particular coal.

This is because removing the mercury upstream of the CPU process is very beneficial as the mercury is then prevented from being able to come into contact with the materials made of aluminum commonly used in the cryogenic equipment employed in the cryogenic stages of the CPU process and does not form an amalgam with the aluminum.

By virtue of the stage of predrying the flue gas by cooling and absorption, it is possible not only to remove a significant proportion of water which is found therein but also simultaneously to reduce the proportion of mercury possibly present in the flue gas until a residual content of mercury is obtained which is acceptable for equipment made of aluminum, that is to say a maximum proportion of mercury of 0.1 µg/Nm$^3$.

This makes it possible to avoid having to resort to additional stages and/or plants dedicated to the specific removal of the mercury, such as one or more guard beds comprising one or more adsorbants which capture the mercury, for example active charcoals impregnated with sulfur often used for this purpose. This is because, by lowering the temperature of the flue gas during the predrying, the vapor pressure of the mercury decreases and, in the case where the temperature reached is below the solidification temperature of mercury, approximately −39° C., the vapor pressure becomes very low, at a level comparable to the limits acceptable for equipment made of aluminum.

The mercury thus removed can be found in several forms, namely at least in part:
  dissolved in metallic form.
  precipitated in the form of a colloidal solution of metal particles which are referred to as micelles, such that their size keeps them in suspension by Brownian motion. Such micelles can have a form of between 3 and 300 nanometers.
  in complex form, in particular in the form of a salt, under the influence of the organic or inorganic compounds used during the washing.
  deposited at the surface of the aerosols present in the gas phase used as nucleating agents.

It should also be noted that other volatile compounds possibly present and which will also be deposited can help in or facilitate the condensation of the mercury. Furthermore, the presence of concentrated $CaCl_2$, for example, will also promote oxidation of the mercury by formation of complexes of the $HgCl_4^{2-}$ type. Furthermore, the calcium chloride brine is acidic and it thus comprises traces of HCl, which is well known for oxidizing elemental mercury to give soluble oxidized mercury $HgCl_2$. The dispersion of the mercury in the form of micelles will also increase its reactivity to form soluble salts, in particular chlorides. To obtain mercury salts instead of metallic mercury is also of use as the removal of these compounds is facilitated by the use of specific ion exchangers.

It should be noted that the arsenic and selenium compounds which are fairly volatile can also be trapped during this stage of predrying the flue gas by direct contact with a suitable cooling liquid, such as 30% calcium chloride.

In all cases, whatever the embodiment employed for removal of water by absorption, the oxy-combustion flue gas which is charged with water and which is at a high temperature, typically of the order of 150 to 250° C., is cooled upstream of the CPU process by means of a coolant fluid to a given temperature far below 0° C., generally below −20° C., so as to bring about condensation of the water which is found therein, indeed even of other impurities, such as mercury.

It may be noted that the difference in temperature between the hot flue gases and the cold heat-exchange fluid is large. Consequently, it may be advantageous in some cases to gradually lower the temperature of the flue gas. For example, use may be made of industrial water at a temperature often of between 10 and 25° C. to carry out a precooling of the flue gases before carrying out the predrying proper by cooling with a cold heat-exchange fluid. This results in an energy optimization of the whole of the process since the flow of heat-exchange fluid at the lowest level of cold would be limited. It is then only necessary to decrease the temperature of the flue gases from 10-25° C. down to the negative temperature, which then causes a reduction in the thermal stresses on the contactors.

EXAMPLE

The present invention has been employed so as to improve a conventional CPU process which makes it possible to produce relatively pure $CO_2$ (i.e., purity >95%) at a pressure compatible with sending via a pipe to a storage site (typically 150-175 bara).

The feed stream is flue gases from the oxy-combustion of coal at a temperature typically of between 100 and 250° C., in this instance of the order of 150° C. This stream is precooled in a water washing tower to a temperature of approximately 40° C.

A typical composition of these flue gases (in molar fraction, at 1 bare and 40° C.) is given in table 1.

TABLE 1

| Compounds | Content (molar fraction) |
| --- | --- |
| $N_2$ | 0.1857 |
| Ar | 0.0111 |
| $O_2$ | 0.0425 |
| Water | 0.0756 |
| $CO_2$ | 0.6839 |
| $NO_x$ | 0.0013 |
| Including $NO_2$ | 120 ppm |
| Nitric acid | 0 |
| $SO_2$ | 44 ppm |
| Sulfuric acid | 0 |

In the CPU process according to the prior art, these flue gases enter the compressor. The high water content, combined with the presence of $NO_x$ and $SO_x$, will promote the formation of acids, in particular nitric acid, nitrous acid, sulfuric acid, sulfurous acid, and the like. In point of fact, the dew points of nitric acid and sulfuric acid are 40° C. Consequently, if these flue gases are compressed and if they are cooled to a temperature of less than 40° C., typically in an intermediate or final compression cooler, these acids will condense and will present problems of corrosion of the equipment and thus will require the use of noble materials, which are expensive.

In order to avoid these problems, according to the invention, the water present in the flue gases will be removed by condensing it before compressing it.

More specifically, by compressing these flue gases up to 25 bara, for example, it is possible to determine the residual water content desired in order to avoid the condensation of the acids during a cooling operation, as illustrated in table 2.

TABLE 2

| Water content (ppm/vol) | Acid dew point at 25 bara | Water dew point at 1 bara |
|---|---|---|
| 500 | 17° C. | −30° C. |
| 350 | 12° C. | −35° C. |
| 200 | 6° C. | −40° C. |

It is seen that if cooling water at 15° C. is available, for example, and if a certain safety margin with regard to the condensation of acid at the end of compressing to 25 bara is desired, the water content of 200 ppm/vol approximately will be targeted, i.e. washing the flue gases with cooling down to −40° C. approximately.

BRIEF DESCRIPTION OF THE FIGURES

To do this, as illustrated in FIGS. 1 and 2 and explained below, it is possible to use a cooling tower 1 by direct contact of the flue gases with a brine, for example formed with water and 30% by weight $CaCl_2$. Such a brine has a eutectic point at approximately −51° C. At −40° C., an operating range of 28% to 32% approximately by weight of $CaCl_2$ exists and a much broader range exists at ambient temperature, that is to say at the outlet of the cooling tower. The condensation of the water will reduce the content by weight by less than 1%, by a diluting effect. Thus, if a content of 30% at the inlet is adopted, it is possible to operate suitably.

On the other hand, if warmer water is available for the cooling it is possible to operate at −30° C. with a broadened operating range of 25% to 33% approximately by weight of $CaCl_2$.

Furthermore, like any salt, the $CaCl_2$ has no vapor pressure and thus it is not found in the vapor form in the predried flue gases sent for compression.

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein:

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

Figure 1:
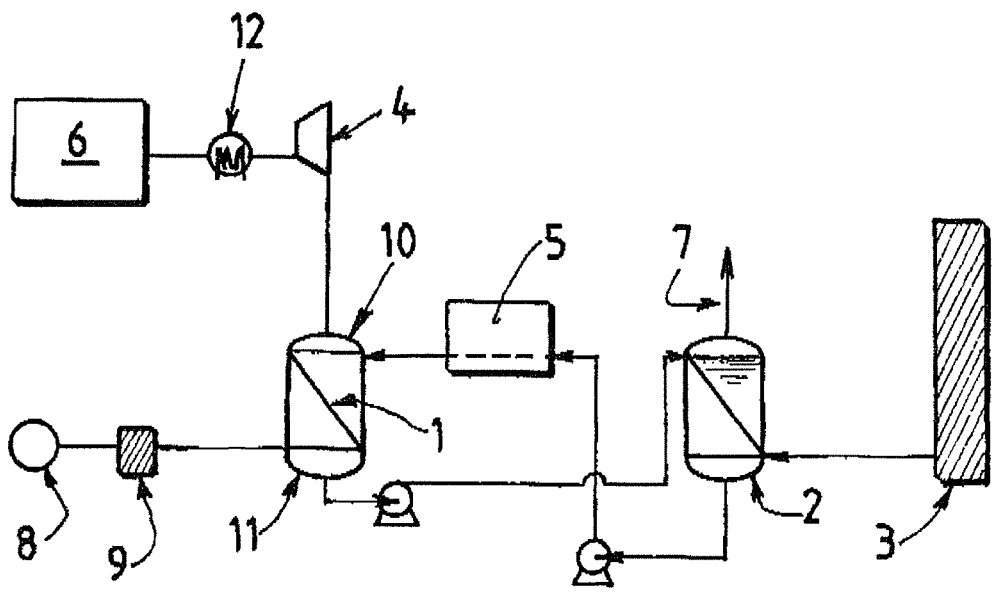

FIG. 1 represents a diagram of a plant for carrying out the process of the invention with cooling, condensation and then cold compression stages. More specifically, a cooling liquid formed of a 30% $CaCl_2$ brine was introduced at a temperature of the order of −40° C. at the top 10 of the flue gases/brine tower 1. The brine originates from a tower 2 and is cooled to the desired temperature in a source of cold 5, that is to say a refrigerating unit.

The flue gases to be treated resulting from an oxy-combustion 8, which are at a temperature of the order of 40° C. and which are saturated with water as a result of a preliminary washing operation in a water tower 9, are injected into the vessel 11 of this tower 1.

Contact between the flue gases and the brine takes place within the tower 1.

Flue gases freed from a portion of the water which was present therein are extracted at the top of this tower 1 at a temperature of the order of −40° C. and a brine comprising a reduced concentration of $CaCl_2$, as a result of the condensation of the water present in the flue gases and thus of the diluting of the brine, is extracted. A predrying of the flue gases is thus carried out within this tower 1 by condensation of the water which is present therein.

The brine is then sent to a brine/nitrogen tower 2, via a recycling loop as explained above, which will make it possible to bring the brine back to its initial concentration by saturation of the dry residual nitrogen originating from a cryogenic air separation unit or ASU unit 3 with the surplus of water originating from the flue gases. The nitrogen flow rate is adjusted so as to evaporate the amount of water condensed within the tower 1, typically 30% of the air flow rate of the unit 3. The nitrogen, charged with water vapor, is vented to the atmosphere (at 7).

At the outlet of this tower 2, the brine was cooled to a level close to the wet bulb temperature of the dry nitrogen, that is to say approximately 10° C., and is then sent to the source of cold 5 and the tower 1.

The brine is transported within the plant via fluid pipes which can be equipped with compressors or pumps used to circulate the fluid.

The flue gases comprising the $CO_2$ but free from at least a portion of the water which is present therein are sent to a compressor 4 which makes it possible to increase the pressure of the stream, prior to the treatment thereof by a CPU process 6 in a conventional fashion, in order to recover, in fine, a gas stream rich in $CO_2$, that is to say typically comprising at least 95% of $CO_2$.

It should be noted that, if necessary, the gas stream can be subjected to an adjustment in temperature (at 12), after the compression 4, so as to bring its temperature to between 0° C. and 100° C., typically at ambient temperature, in particular between 20 and 40° C.

Figure 2:
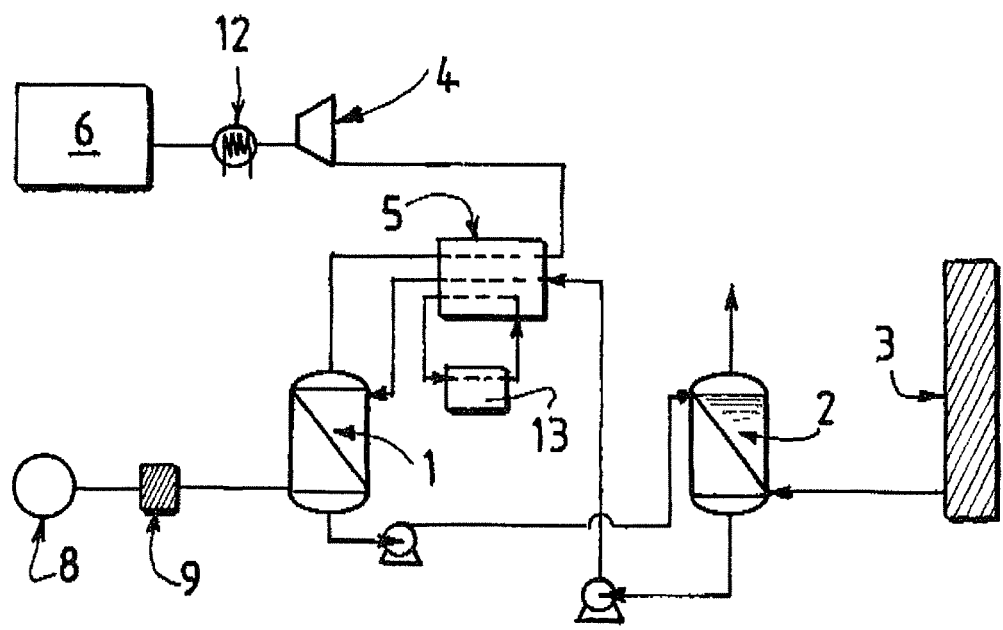

FIG. 2 represents a diagram of an alternative form of the plant for carrying out the process of the invention of FIG. 1 comprising an additional heating stage.

More specifically, the plant of FIG. 2 comprises an exchanger 5 for recovery of heat which cools the brine by indirect contact with the cold flue gases, which thus heats up the flue gases. The flue gases, comprising a low water content, will thus be compressed at an ambient temperature, that is to say a temperature of the order of 20 to 25° C.

The contribution of cold is markedly reduced, since it is used only to condense the water present in the flue gases (apart from the irreversibilities of the system).

It should be noted that the source of cold 13 used to even further cool the brine by heat exchange can be an independent refrigeration cycle, a combination with the cycle of the cryogenic unit 3, a combination with the cycle of the CPU process, an adsorption unit, optionally with recovery of the heat of compression of the flue gases, or in part gas resulting from an evaporation of the liquid oxygen bleed from the vaporizer of the cryogenic unit 3. It should be emphasized in the latter case that, in order to prevent the flue gases or the brine from freezing, use may be made of an intermediate fluid (for example nitrogen) which is maintained at a compatible minimum temperature, typically, at −45° C. for our example of cooling the flue gases to approximately −40° C.

The regeneration of the brine, that is to say the removal of the condensed water, can be carried out in the brine/nitrogen tower 2 supplied with residual nitrogen originating from the cryogenic unit 3. A small contribution of "fresh" brine and a bleed make it possible to control the content of impurities (closed system).

Alternatively, the regeneration of the brine can also be carried out by heating (evaporation of water) or by contributing and bleeding off large amounts (open system).

One of the other advantages provided by the present invention is that it makes it possible to use nonnoble materials, such as carbon steel, for example, in a good part of the downstream items of equipment, essentially compressors and associated cooling systems, in place of stainless steel, for example, which results in a significant reduction in the overall capital cost.

Another advantage is the immediate removal of minor compounds which present problems in the CPU process, such as mercury, which can be formed as amalgams with the aluminum conventionally used in the cryogenic parts of the items of equipment.

Yet another advantage, is the reduction, simplification and indeed even elimination of the drying system after the compression and before the cryogenic cold box.

What is claimed is:

1. A process for the treatment of a gas stream comprising a combustion flue gas comprising $CO_2$ in an initial proportion, water vapor, mercury, one or more volatile acidic compounds and one or more additional impurities chosen from oxygen, nitrogen and argon, said process comprising:
    i) cooling the gas stream to a temperature of between approximately −10° C. and approximately −130° C. and a removal of at least one additional impurity and predrying by adsorption/condensation of the stream in order to remove therefrom at least a portion of the water vapor which is present therein, and at least a portion of the mercury by a cooling liquid;
    ii) compressing the gas stream down to a final pressure of between 1 bar and 74 bar absolute; and
    iii) recovering a gas stream enriched in $CO_2$ comprising a final proportion of $CO_2$ greater than the initial proportion of $CO_2$ in the stream to be treated,
    wherein the pre-drying by absorption/condensation of the stream is carried out by bringing the gas stream into direct contact with a cooling liquid at a temperature of less than or equal to −20° C.,
    wherein the cooling liquid comprises an aqueous salt or a mixture of aqueous salts.

2. The process of claim 1, wherein the cooling liquid comprises calcium chloride or lithium chloride.

3. The process of claim 1 wherein one or more volatile acidic compounds are chosen from NOx and SOx.

4. The process of claim 1 wherein the flue gas to be treated results from an oxy-combustion process or plant or from a process or plant for the manufacture of cement.

5. A process for the treatment of a gas stream comprising a combustion flue gas comprising $CO_2$ in an initial proportion, water vapor, mercury, one or more volatile acidic compounds and one or more additional impurities chosen from oxygen, nitrogen and argon, said process comprising:
    i) cooling the gas stream to a temperature of between approximately −10° C. and approximately −130° C. and a removal of at least one additional impurity and predrying by adsorption/condensation of the stream in order to remove therefrom at least a portion of the water vapor which is present therein, and at least a portion of the mercury by a cooling liquid;
    ii) compressing the gas stream down to a final pressure of between 1 bar and 74 bar absolute;
    iii) recovering a gas stream enriched in $CO_2$ comprising a final proportion of $CO_2$ greater than the initial proportion of $CO_2$ in the stream to be treated,
    wherein after pre-drying by absorption/condensation, the pre-dried stream is reheated by heat exchange with cooling liquid, prior to bringing said cooling liquid into contact with the stream comprising water vapor to be removed.

6. The process of claim 5, wherein the cooling fluid is recovered after it has been brought into contact with the stream and is recycled after adjusting the concentration of said cooling liquid.

7. The process of claim 5, wherein the adjusting of the concentration of said cooling liquid recovered after it has been brought into contact with the stream is carried out by bleeding off a portion of the cooling liquid charged with water and adding fresh cooling liquid.

8. The process of claim 5, wherein the adjusting of the concentration of said cooling liquid recovered after it has been brought into contact with the stream is carried out by drying said cooling liquid by bringing into contact with a dry gas and discharging a bleed stream comprising said dry gas and water vapor.

9. The process of claim 8, wherein the dry gas is nitrogen resulting from a cryogenic distillation unit.

* * * * *